Patented Aug. 12, 1941

2,251,932

UNITED STATES PATENT OFFICE 2,251,932

HALOGENATED SULPHO-ACETIC ACID ESTERS

Benjamin R. Harris and Frank J. Cahn, Chicago, Ill., assignors to The Emulsol Corporation, Chicago, Ill., a corporation of Illinois No Drawing. Application December 11, 1939, Serial No. 308,578

12 Claims. (Cl. 260—481)

This invention relates to new chemical compounds having novel and important properties, and is particularly concerned with the preparation of compounds possessing a high degree of utility in the detergent, wetting, and similar fields.

Among the compounds heretofore suggested for these and related purposes are the lower molecular weight sulpho-carboxylic acid esters of higher molecular weight alcohols, reference being made, for example, to U. S. Patents Nos. 2,028,091; 2,166,141; 2,166,142; 2,166,143; 2,166,144; and 2,166,145. In general, while these compounds are highly satisfactory for many purposes, there are certain factors in relation to which some difficulties have been encountered, and the overcoming of which is brought about in accordance with the present invention.

It has been discovered that sulpho-acetic acid esters of lauryl alcohol or mixtures comprising largely of predominantly lauryl alcohol or commercial alcohols often designated as "Laurol" or "Lorol," which are halogenated so that the halogen enters the alcohol portion of the molecule, at random and in substantial amount, possess highly satisfactory and unexpectedly useful characteristics. Of especial utility are the alkali metal salts of the sulpho-acetic acid ester of lauryl alcohol which contains chlorine randomly disposed in the alcohol portion of the molecule, as hereinafter described.

The following examples are illustrative of methods which have been found suitable for preparing the compounds which are disclosed herein. It will be appreciated that proportions of reacting ingredients, times of reaction, order of steps, and temperatures are subject to some variation and that supplementary processes of purification and the like may be resorted to wherever found desirable or convenient. These and other variations and modifications will be clear to those skilled in the art in the light of the guiding principles which are disclosed herein.

*Example I*

(a) Lauryl chloracetate, prepared by esterifying commercial lauryl alcohol with chloracetic acid, was placed in a reaction flask fitted with an ascending condenser, and was randomly chlorinated in the dark, for a period of one hour, by bubbling chlorine thereinto, the temperature rising from 100 degrees C. to 160 degrees C. during the reaction. The reaction product was then washed with water and dried with the aid of sodium sulphate. The dried material contained 28% chlorine.

(b) 61.35 grams of the product produced in Part a hereof were stirred for 1½ hours at 90 degrees C. with a solution containing 31.3 grams of potassium meta bisulphite, 15.45 grams of potassium hydroxide, and 60 cc. of water. The reaction product was then diluted with 100 cc. of water, 1000 cc. of boiling isopropyl alcohol were added, and the mass was filtered, while hot, to remove the inorganic salts. Upon cooling of the filtrate to 20 degrees C., a white fluffy material was deposited. The material was filtered on a Buchner funnel and dried at 100 degrees C., 43 grams of dried material being recovered. The dried material was white, waxy in nature, and was soluble to the extent of 20 parts thereof in 80 parts of water at 25 degrees C., the resulting solution being brilliantly clear and viscous. On cooling, the solution became cloudy, which, however, on warming, cleared up. The solution had excellent foaming, wetting and detergent properties. The dry product, in 0.1% concentration in the Draves test, wetted out in 20 seconds. An analysis of the compound showed a chlorine content of 11.8%, said analysis also showing that the chlorine was present in the lauryl alcohol portion of the molecule as distinguished from the sulphoacetic acid portion of said molecule. The sulphur content, on analysis, was found to be 7.8%. Aqueous solutions of the product can be thickened or their consistency increased by adding thereto small proportions of compounds such as monoethanolamine sulphate, diethanolamine sulphate, and other thickening agents such as are disclosed in the application of Morris B. Katzman and Frank J. Cahn, Serial No. 180,662, filed December 18, 1937.

*Example II*

(a) 161 grams of lauryl chloracetate were placed in a reaction flask provided with an ascending condenser and there were added thereto, dropwise and with stirring, 113 grams of bromine over a period of two hours, the reaction mixture being maintained at 130 degrees C.–145 degrees C. during the reaction. The reaction product showed a weight increase of 50.8 grams.

(b) 70.9 grams of the product of Part a hereof, after being washed and dried, were stirred at a temperature of 95 degrees C. for about 4 hours with a solution containing 27.6 grams of potassium meta bisulphite, 13.7 grams of potassium hydroxide, 5 grams of potassium sulphite, and 70 cc. of water. From the pasty reaction mixture, an aqueous solution separated out on cooling, this being removed and discarded. To the pasty reaction product, 50 cc. of water were added together with 500 cc. of boiling isopropyl alcohol, the mass then being filtered, while hot, to remove the inorganic salts. On cooling the filtrate, a white, microcrystalline material deposited out and this was filtered off. This material, after drying, amounted to 25.1 grams. A 3.0% aqueous solution of this material, at a temperature of 25 degrees C., had excellent foaming, cleansing, and wetting properties.

For many purposes, isolation or purification may be dispensed with and the crude reaction product utilized as such, in wet or dried form.

As is indicated in the preceding examples, it is preferred that the halogen be randomly introduced into the lauryl alcohol chloracetate or bromacetate or the like, followed by the reaction with the sulphurous acid salt to introduce the sulphonic group or groups into the molecule. Other methods, generally less satisfactory, comprise preliminarily randomly halogenating the lauryl alcohol and then converting the same into the corresponding sulphoacetate, by reaction with monosodium sulphoacetate or by means of a halo-acetic acid followed by reaction with an alkali sulphite. A still further method comprises producing a hydroxylated lauryl alcohol in which the hydroxyl groups are randomly arranged, replacing said hydroxyl groups with halogen by means of phosphorous trichloride or penta-chloride or by means of thionyl chloride, and then converting the resulting alcohol into a sulpho-acetic acid ester as described.

As previously indicated, the halogen enters the alcohol portion of the molecule at random. In other words, in effect, the final product appears to comprise a mixture of several isomers, approximately eleven in number. The properties or characteristics of these isomers are different, each contributing its own to the product as a whole and, no doubt, modifying the properties and characteristics of the others. The result of the composite product, however, is one of a highly desirable nature. In the light of this situation, it will be clear that, in general, the novel products of the present invention may frequently best be defined in the form of reaction products. It will also be clear that the products of the present invention are sharply distinguishable, not only in their chemical structure but also in their properties from the sulpho-acetic acid esters of higher molecular weight unsaturated alcohols wherein the double bond or bonds of said unsaturated alcohols are satisfied by halogen.

The products of the present invention are particularly useful for detergent purposes, such as hair shampoos, dentifrices, and the like due to the unique foam structure, particularly the compactness and stability thereof. They may also be employed for the various purposes for which wetting and detergent agents are utilized, as indicated, for example, in the patents cited in an earlier part of this specification. Apart from their advantages due to their properties and characteristics, their manufacture also offers certain advantages, particularly where alkali metal salts are produced, such products being, in general, more amenable to purification procedures since, in many instances, it is possible to dispense with the employment of organic solvents.

While any of the halogens may be employed for the purposes of the present invention, especially satisfactory results are obtained if the halogen is chlorine, this representing the particularly preferred embodiment of the invention. Furthermore, while various salts of the halogenated sulphoacetates of lauryl alcohol may be utilized, the sodium and potassium salts are unusually suitable.

What we claim as new and desire to protect by Letters Patent of the United States is:

1. Sulpho-acetic acid esters of randomly halogenated alcohols of the class consisting of lauryl alcohol and mixtures of higher alcohols comprising largely lauryl alcohol.

2. Sulpho-acetic acid esters of randomly chlorinated alcohols of the groups consisting of lauryl alcohol and mixtures of higher alcohols comprising largely lauryl alcohol.

3. Alkali salts of sulpho-acetic acid esters of chlorinated alcohols of the group consisting of lauryl alcohol and mixtures of higher alcohols comprising largely lauryl alcohol, the alcohol portion of the molecule of said compounds being randomly chlorinated, the chlorine contained in said compounds comprising not substantially less than 5% by weight.

4. Alkali metal salts of the sulpho-acetic acid ester of randomly halogenated lauryl alcohol, the halogen content of said compound being in excess of 5%.

5. Sulphoacetates of randomly chlorinated lauryl alcohol, the chlorine present therein being of the order of about 11.5%.

6. The process which comprises halogenating a halogeno-acetic acid ester of a member of the group consisting of lauryl alcohol and mixtures of higher alcohols comprising largely lauryl alcohol, to introduce halogen in the alcohol chain at random positions, and then converting the resulting compound into a sulphonic derivative by introducing a sulphonic group into the compounds.

7. The process which comprises halogenating a halogeno-acetic acid ester of a member selected from the group consisting of lauryl alcohol and mixtures of higher alcohols comprising largely lauryl alcohol, to introduce halogen into the alcohol chain at random positions, and then reacting the resulting compound with a salt of sulphurous acid to introduce a sulphonic group into the compound.

8. The process which comprises chlorinating a member selected from the group consisting of chloracetates and bromacetates of lauryl alcohol and mixtures of higher alcohols comprising largely lauryl alcohol, to introduce chlorine into the alcohol chain at random positions, and then reacting the resulting compound with an alkali sulphite to introduce sulphonic groups into the compound.

9. The process which comprises chlorinating a chloracetic acid ester of a member selected from the group consisting of lauryl alcohol and mixtures of higher alcohols comprising largely lauryl alcohol to introduce not substantially less than 10%, by weight, of chlorine into the alcohol chain at random positions, and then reacting the resulting componud with an alkali sulphite to introduce sulphonic groups into the compound.

10. The process which comprises halogenating a chloracetic acid ester of a member selected from the group consisting of lauryl alcohol and mixtures of higher alcohols comprising largely lauryl alcohol, to introduce not substantially less than 10%, by weight, of halogen into the alcohol chain at random positions, and then reacting the resulting compound with an aqueous solution of an alkali metal sulphite to introduce sulphonic groups into the compound.

11. The class consisting of sodium and potassium salts of sulphoacetates of halogenated lauryl alcohol.

12. The class consisting of sodium and potassium salts of sulphoacetates of chlorinated lauryl alcohol.

BENJAMIN R. HARRIS.
FRANK J. CAHN.